United States Patent [19]

Takahashi

[11] Patent Number: 5,185,731
[45] Date of Patent: Feb. 9, 1993

[54] OPTICAL DATA RECORDING AND REPRODUCING APPARATUS INCLUDING OPTICAL DETECTOR FOR DETECTING LIGHT BEAMS REFLECTED BY A PLANE PARALLEL PLATE AND THEN DIFFRACTED BY A DIFFRACTION GRATING

[75] Inventor: Shinichi Takahashi, Saitama, Japan
[73] Assignee: Pioneer Electronic Corporation, Tokyo, Japan
[21] Appl. No.: 889,057
[22] Filed: May 27, 1992
[30] Foreign Application Priority Data Nov. 18, 1991 [JP] Japan .................. 3-301773

[51] Int. Cl.$^5$ .................. G11B 7/095; G11B 7/12
[52] U.S. Cl. .................. 369/44.23; 369/44.12; 369/44.14; 369/44.37; 369/109
[58] Field of Search .......... 369/109, 112, 110, 44.23, 369/44.12, 44.14, 44.37, 44.41, 44.42

[56] References Cited

U.S. PATENT DOCUMENTS

| | | | |
|---|---|---|---|
| 4,358,200 | 11/1982 | Heemskerk et al. | 369/109 |
| 4,753,513 | 6/1988 | Shikama | 369/112 |
| 4,768,183 | 8/1988 | Ohnishi et al. | 369/44.37 |
| 4,817,072 | 3/1989 | Toide et al. | 369/109 |
| 4,817,074 | 3/1989 | Yamanaka | 369/44.42 |
| 5,084,851 | 1/1992 | Noda et al. | 369/44.42 |

FOREIGN PATENT DOCUMENTS

| | | | |
|---|---|---|---|
| 62-114131 | 5/1987 | Japan | 369/44.12 |
| 63-119024 | 5/1988 | Japan | 369/44.42 |

*Primary Examiner*—Hoa T. Nguyen
*Attorney, Agent, or Firm*—Sughrue Mion Zinn Macpeak & Seas

[57] ABSTRACT

An optical data recording and reproducing apparatus in which a light beam is diffracted into three light beams. The three light beams are reflected by a first surface of a plane parallel plate and applied through an objective lens to a recording medium, which forms three signal light beams. The three signal light beams are reflected back to the plane parallel plate and partially reflected by a second surface of the plate. A first optical detector detects one of the three signal light beams, which corresponds to the main light beam of the 0-th order of diffraction. A second optical detector detects a light beam of the −1st order of diffraction corresponds to the auxiliary light beam of the +1st order of diffraction and a light beam of the +1st order of diffraction corresponding to the auxiliary light beam of the −1st order of diffraction. Accordingly, the second optical detector can output a tracking error signal without interference by the main light beam.

7 Claims, 4 Drawing Sheets

OPTICAL DATA RECORDING AND REPRODUCING APPARATUS INCLUDING OPTICAL DETECTOR FOR DETECTING LIGHT BEAMS REFLECTED BY A PLANE PARALLEL PLATE AND THEN DIFFRACTED BY A DIFFRACTION GRATING

Optical data recording and reproducing apparatus including optical detector for detecting light beams reflected by a plane parallel plate and then diffracted by a diffraction grating.

BACKGROUND OF THE INVENTION

The present invention relates to an optical data recording and reproducing apparatus in which image data signals are recorded on and then reproduced from a recording medium. More particularly, the invention relates to an optical data recording and reproducing apparatus of a three-beam type using a plane parallel plate.

A conventional three-beam type optical data recording and reproducing apparatus is shown in FIGS. 4 and 5. The conventional apparatus includes a light source 1 such as a semiconductor laser for generating a light beam to read data out of an optical disk 100, a diffraction grating 2 for dividing the output light beam of the light source into three light beams, a plane parallel plate 3 for reflecting the three light beams towards the optical disk 100 and for astigmatizing the three signal light beams reflected from the optical disk 100, an objective lens 4 for image-forming the three signal light beams reflected from the plane parallel plate 3 on to a recording surface 101 of the optical disk 100, a concave lens 7 for transmitting the three signal light beams which have passed through the plane parallel plate 3, which increases the distances between those signal light beams, and an optical detector 8 adapted to receive the three signal light beams passing through the concave lens 7.

The operation of the conventional apparatus thus constructed will now be described.

The output light beam of the light source 1 is diffracted by the diffraction grating 2 in three directions corresponding to the zeroth, positive first, and negative first (0-th, +1st, and −1st) orders of diffraction and also corresponding to the three light beams described above. The three light beams are reflected by a surface of the plane parallel plate 3 towards the objective lens 4, which focuses the reflected beams onto the recording surface 101 of the optical disk 100. The three light beams are modulated with a variation in reflectivity of the recording surface 101 and converted into signal light beams.

The signal light beams are reflected through the objective lens 4 and the plane parallel plate 3, where they are astigmatized, towards the concave lens 7. The signal light beams are applied to the concave lens 7 at such incident angles that they are focused on a front focal plane 41 (FIG. 5) of the objective lens 4. The concave lens image-forms the signal light beams on the detecting surface of the optical detector 8.

Referring to FIG. 5, without the concave lens 7, the three signal light beams (dotted lines) focus on the front focal plane 41 with a small distance L therebetween. However, because of the diffusion characteristic of the concave lens 7 (which corresponds to the magnification of the concave lens 7), the three signal light beams are image-formed on two photo-diodes (PD) 82 and 83 and a four-division photo-diode (4D-PD) 81 of the optical detector 8 with a distance $L_2$ ($L_2 > L_1$) therebetween.

However, the conventional optical data recording and reproducing apparatus has the following disadvantages. In the conventional apparatus, it is necessary to interpose the concave lens 7 in the optical path to increase the distances between the three signal light beams. But, because of the magnification of the concave lens, the optical path is increased as much as a distance $L_3$ as shown in FIG. 5. Consequently, it is very difficult, if not impossible, to miniaturize the optical recording and reproducing apparatus.

The above-described difficulties may be eliminated by another conventional optical reproducing apparatus wherein a concave lens is not used. In this case, signal light beams, which are reflected by the recording medium, are partially reflected by the second surface (i.e., the bottom side in FIG. 4) of the plane parallel plate 3. A portion of the signals which pass through the second surface are detected by a first optical detector. On the other hand, a second portion of the signal light beams are reflected by the second surface through the first surface (i.e., the top side in FIG. 4) of the plane parallel plate 3. This latter portion of signal light beams are diffracted by the diffraction grating and are detected by a second optical detector.

The first mentioned optical detector detects the main light beam (of the 0-th order of diffraction) of the three signal light beams and outputs an RF signal and a focus error signal. The second optical detector detects the two auxiliary light beams (of the +1st and −1st orders of diffraction) of the three signal light beams and outputs a tracking error signal.

In this optical data recording and reproducing apparatus, however, the three signal light beams which are reflected by the second surface back towards the light source are again diffracted by the diffraction grating. Thus, in addition to the diffraction of the two auxiliary light beams (of the +1st and −1st orders of diffraction), the main light beam (of the 0-th order of diffraction) is diffracted and applied to the second optical detector. As a result, it is impossible to detect the tracking error signal correctly. This too is a problem.

SUMMARY OF THE INVENTION

Accordingly, it is a general object of the present invention to provide an optical recording and reproducing apparatus which is free of the above-mentioned problems and disadvantages.

It is also an object of the present invention to provide an optical data recording and reproducing apparatus which detects signal light beams with high accuracy and which can be miniaturized.

In accordance with the above and other objects, the present invention provides an optical image recording and reproducing apparatus including a light source for generating a light beam to read data from a recording surface of a recording medium, a diffraction grating for diffracting an input light beam into three light beams comprising a main light beam of the 0-th order of diffraction, an auxiliary light beam of the +1st order of diffraction, and an auxiliary light beam of the −1st order of diffraction, a plane parallel plate, having a first surface and a second surface, receiving the three light beams which correspond to the light beam being diffracted by the diffraction grating, the three light beams being reflected by the first surface towards the recording surface of the recording medium and formed into three signal light beams, the signal light beams then being transmitted back to the plane parallel plate wherein the signal light beams are partially reflected by the second surface, a first optical detector for detecting the main light beam of the 0-th order of diffraction of the signal light beams passing through the second surface of the plane parallel plate and for outputting an RF signal and a focus servo control signal corresponding thereto, and a second optical detector for detecting a first light beam of the −1st order of diffraction of the auxiliary light beam of the +1st order of diffraction and a second light beam of the +1st order of diffraction of the auxiliary light beam of the −1st order of diffraction and for outputting a tracking error signal corresponding thereto, wherein the first and second light beams being generated by the diffraction grating diffracting the three signal light beams reflected by the second surface of the plane parallel plate.

The above and other objects, features, and advantages of the present invention will become more apparent from the following detailed description taken in conjunction with the accompanying drawings.

DESCRIPTION OF THE PREFERRED EMBODIMENTS

A preferred embodiment of the invention will be described with reference to FIGS. 1 through 3.

Figure 1:
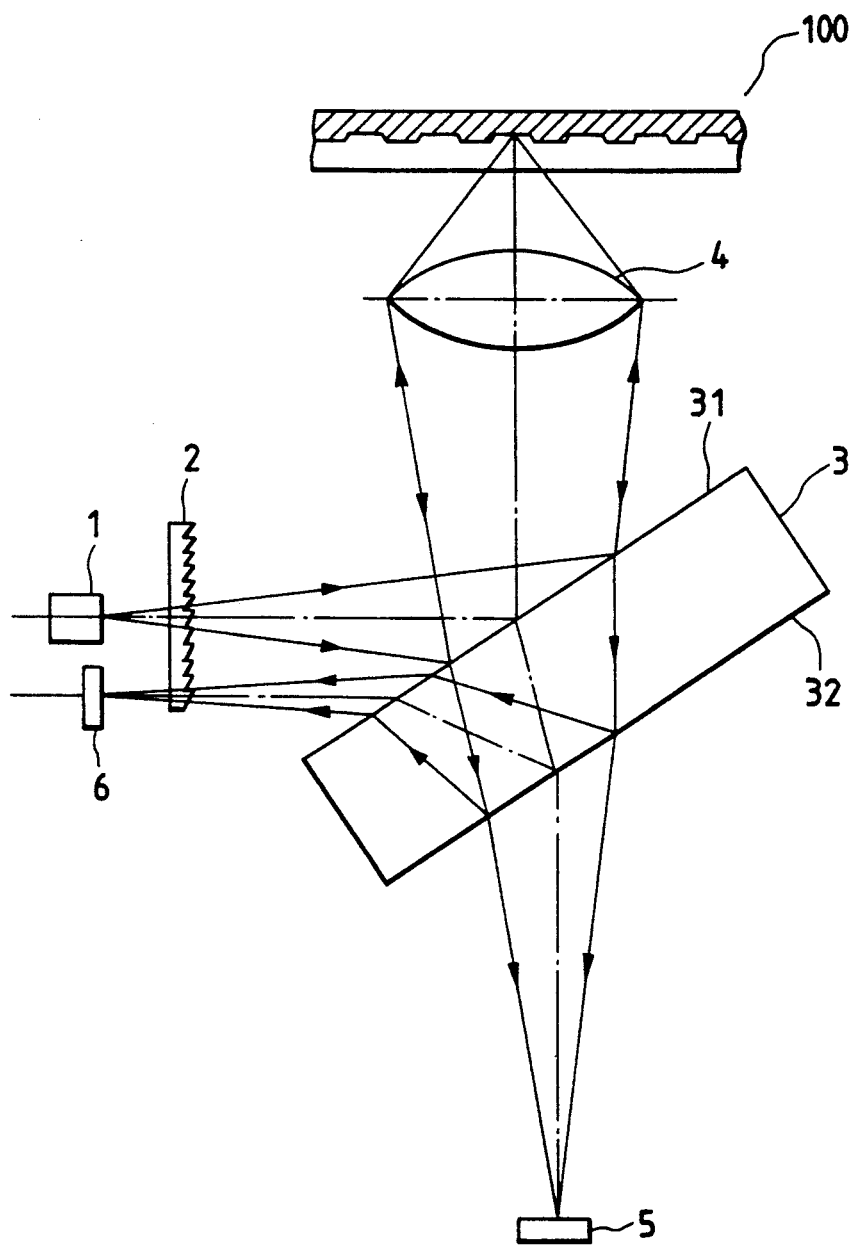
FIG. 1 illustrates an optical data recording and reproducing apparatus in accordance with a preferred embodiment of the present invention.
Figure 2:
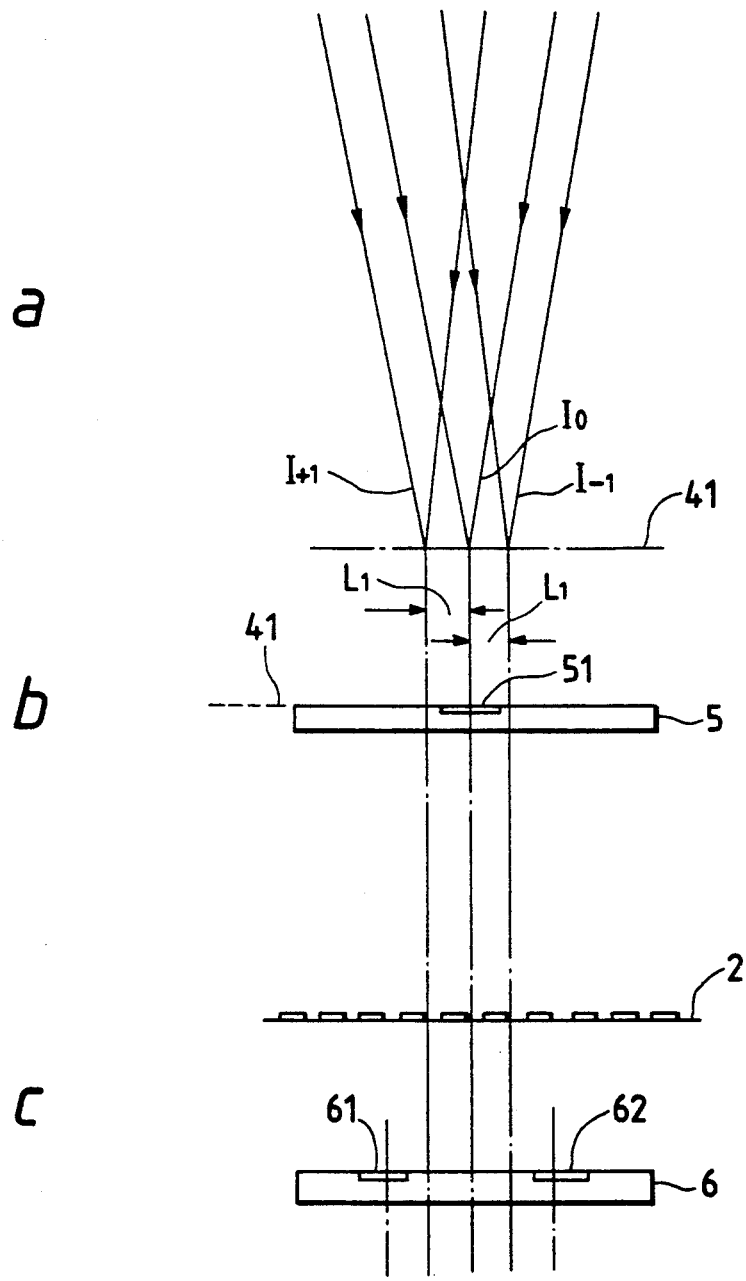
FIG. 2 illustrates the reception of signal light beams in the apparatus of FIG. 1.

FIG. 1 shows an optical data recording and reproducing apparatus, which includes a light source 1, a diffraction grating 2, a plane parallel plate 3, an objective lens 4, and first and second optical detectors 5 and 6 for detecting the signal light beams emerging from the plane parallel plate 3. The plane parallel plate 3 is a transparent medium having first and second surfaces 31 and 32 which are in parallel with each other.

The output light beam of the light source 1 is divided into three light beams of the 0-th, +1st, and −1st orders of diffraction, which are reflected by the first surface 31 of the plate 3 and applied to the optical disk 100 via the objective lens 4. The three light beams are converted into three signal light beams when reflected by the recording surface 101 of the optical disk 100. The three signal light beams are applied to the first surface 31 of the plane parallel plate 3 and transmitted through the second surface 32. In this operation, a first portion of the three signal light beams pass through the plate 3 towards the first optical detector 5. A second portion of the three signal light beams are reflected by the second surface 32 back through the first surface 31 towards the diffraction grating 2 and the second optical detector 6.

The first optical detector 5 has a four-division photo-diode (4D-PD) 51 (FIG. 2) disposed at a front focal plane 41 of the objective lens 4 in such a manner that it confronts the second surface 32 of the plane parallel plate 3. The detector 5 detects the main light beam $I_0$ (of the 0-th order of diffraction) of the three signal light beams emerging from the second surface 32 of the plane parallel plate 3 and outputs an RF signal and a focus servo control signal.

The second optical detector 6 includes two photo-diodes 61 and 62 are disposed at the front focal plane 41 of the objective lens 4, and confront the first surface 31 of the plane parallel plate 3. That is, the photo-diodes 61 and 62 are positioned where the three signal light beams $I_0$, $I_{+1}$ and $I_{-1}$ emerge from the first surface 31 of the plane parallel plate after being diffracted by the diffraction grating 2.

Figure 3:
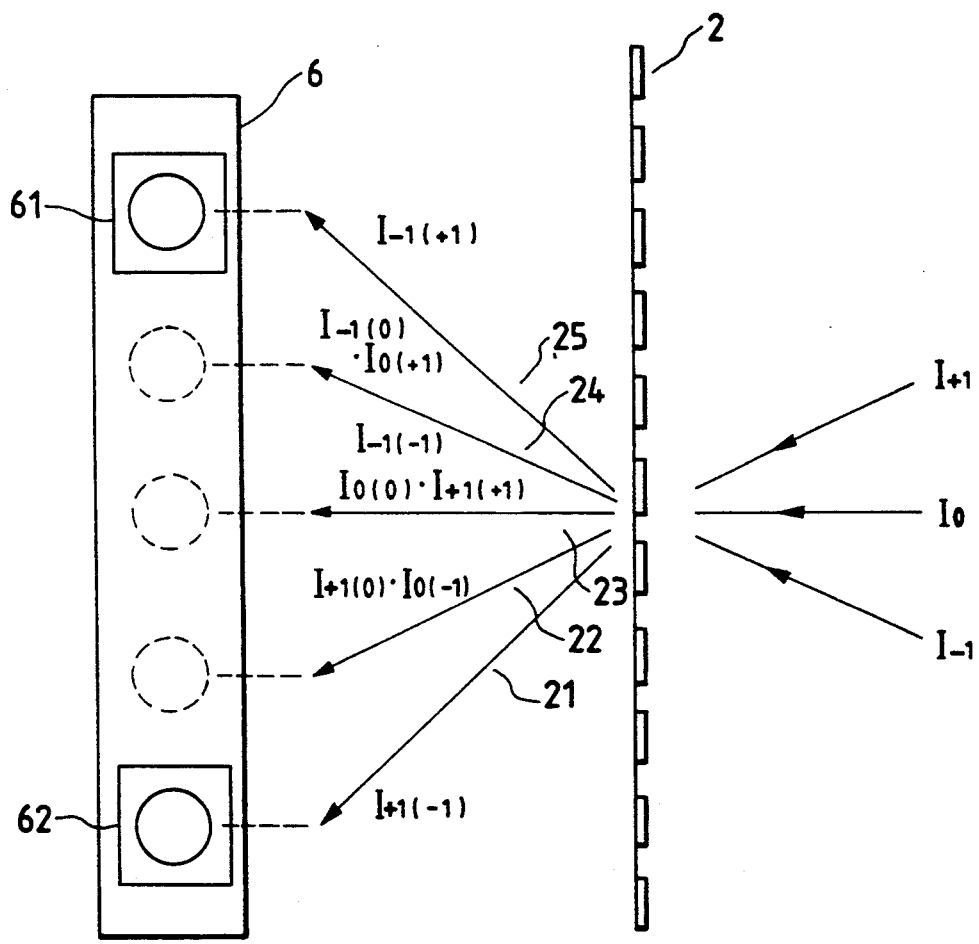
FIG. 3 is an enlarged view of an optical detector of the apparatus of FIG. 1.
Figure 4:
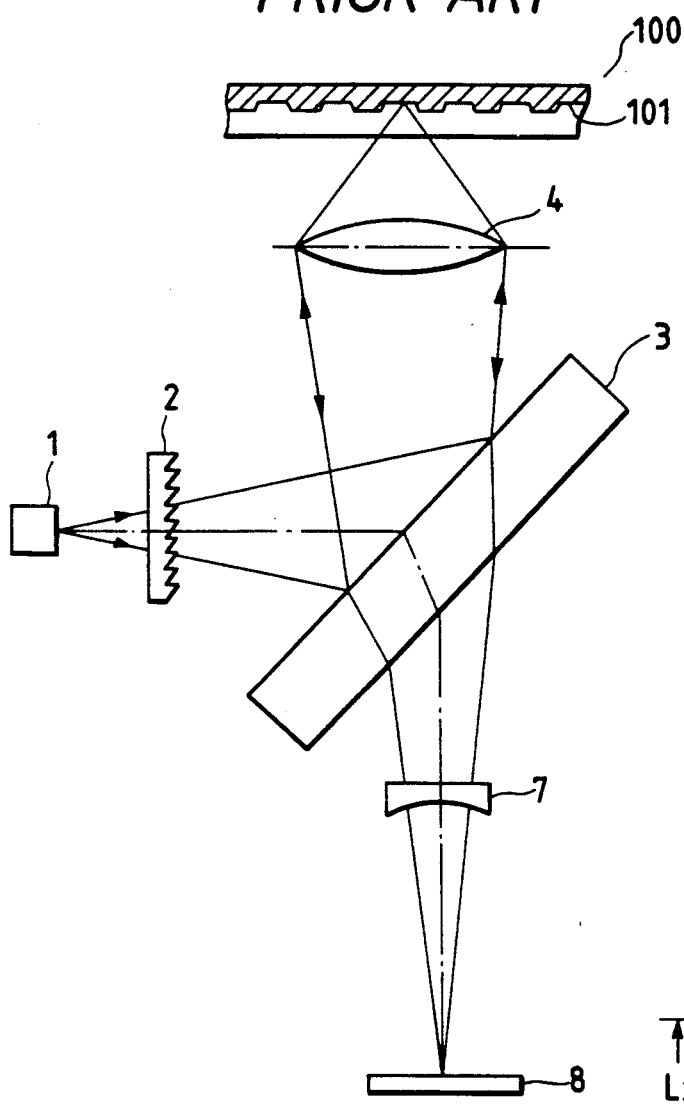
FIG. 4 illustrates a conventional optical data recording apparatus.
Figure 5:
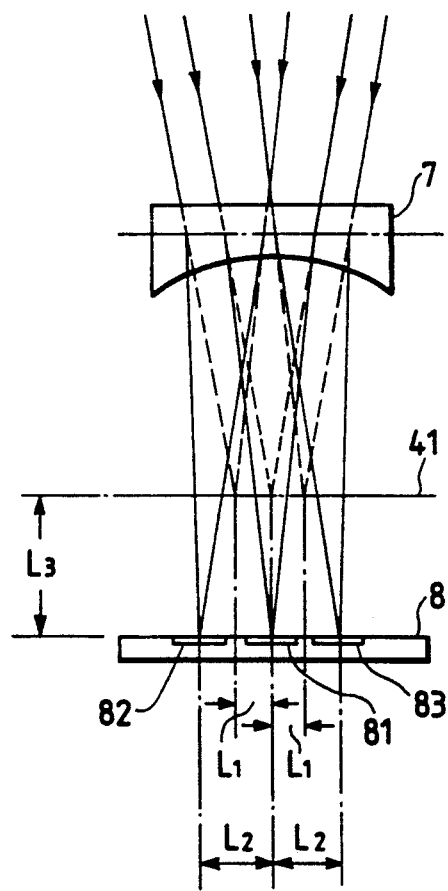
FIG. 5 is an enlarged diagram illustrating the reception of signal light beams in the conventional apparatus of FIG. 4.

With reference to FIG. 3, the three signal light beams $I_0$, $I_{+1}$ and $I_{-1}$ are diffracted by the diffraction grating 2. When the signal light beam $I_0$ corresponding to the main light beam, and the light beams $I_{+1}$ and $I_{-1}$ corresponding to the auxiliary light beams of the +1st and −1st orders of diffraction are applied to the diffraction grating 2, they are diffracted according to their incident angles, respectively. Consequently, the light beams 21, 22, 23, 24, and 25 are produced. The light beam 21 corresponds to the light beam of the −1st order of diffraction $I_{+1(-1)}$ of the signal light beam $I_{+1}$. The light beam 22 corresponds to the light beam of the 0-th order of diffraction $I_{+1(0)}$ of the signal light beam $I_{+1}$ and the −1st order of diffraction $I_{0(-1)}$ of the signal light beam $I_0$. The light beam 23 corresponds to the light beam of the +1st order of diffraction $I_{+1(+1)}$ of the signal light beam $I_{+1}$, the 0-th order of diffraction $I_{0(0)}$ of the signal light beam $I_0$, and the −1st order of diffraction $I_{-1(-1)}$ of the signal light beam $I_{-1}$. The light beam 24 corresponds to the light beam of the 0-th order of diffraction $I_{-1(0)}$ of the signal light beam $I_{-1}$ and the +1st order of diffraction $I_{0(+1)}$ of the signal light beam $I_0$. Finally, the light beam 25 corresponds to the light beam of the +1st order of diffraction $I_{-1(+1)}$ of the signal light beam $I_{-1}$.

The photo-diodes 61 and 62 respectively receive the light beams 25 and 21 of the +1st order of diffraction $I_{+1(-1)}$ and of the −1st order of diffraction $I_{-1(+1)}$ and output a tracking servo control signal. Each of these light beams 21 and 25 do not contain either the signal light beam $I_0$ or any orders of diffraction of the signal light beam $I_0$, thus, an accurate tracking servo control signal can be generated.

The operation of the optical data recording and reproducing apparatus thus constructed will now be described.

First, the output light beam is diffracted in three directions corresponding to the 0-th, +1st-, and −1st orders of diffraction. The three light beams are reflected by the first surface 31 of the plane parallel plate 3 through the objective lens 4 towards the optical disk 100. The objective lens 4 serves to focus the three light beams on to the recording surface 101 of the optical disk 100 so that they are modulated with the variation in reflectivity of the recording surface 101 into three signal light beams $I_0$, $I_{+1}$, and $I_{-1}$.

The first portion of the three signal light beams $I_0$, $I_{+1}$, and $I_{-1}$ are transmitted through the plane parallel plate 3 to the four-division photo-diode (4D-PD) 51 of the first detector 5. The second and remaining portions of the three signal light beams are reflected by the second surface 32 of the plane parallel plate 3 and transmitted through the first surface 32 towards the diffraction grating 2 and the second detector 6.

The three signal light beams $I_0$, $I_{+1}$, and $I_{-1}$ are applied to the four-division photo-diode 51 and the photo-diodes 61 and 62 as shown in FIG. 2a. Of the three signal light beams, the signal light beam $I_0$, which corresponds to the main light beam, is received by the four-division photo-diode 51 wherein an RF signal and a focus servo signal is generated in a conventional manner.

The signal light beam $I_0$ corresponding to the main light beam, and the signal light beams $I_{+1}$ and $I_{-1}$ corresponding to the auxiliary light beams of the +1st and −1st orders of diffraction are applied to the diffraction grating 2 as shown in FIG. 2c. Only the light beams of the +1st and −1st order of diffraction $I_{+1(-1)}$ and $I_{-1(+)}$ of the signal light beams $I_{+1}$ and $I_{-1}$, which respectively correspond to the auxiliary light beams of the +1st and −1st orders of diffraction, are detected by the two photo-detectors 61 and 62 of the second optical detector 6.

The position where the light beam 21 of the −1st order of diffraction $I_{+1(-1)}$ of the signal light beam $I_{+1}$ and the light beam 25 of the +1st order of diffraction $I_{-1(+1)}$ of the signal light beam $I_{-1}$ are image-formed, the signal light beam $I_0$ corresponding to the main light beam has minimal effect. Although the light beams of the +2nd and −2nd orders of diffraction of the signal light beam $I_0$ are also formed at these positions (i.e., 21 and 25), they are extremely low in luminance and therefore do not have any effect.

In the above-described embodiment, the plane parallel plate 3 is a transparent medium having two parallel surfaces. However, it may be formed of coating a half-mirror on one surface 31 of the transparent medium.

As described above, in the apparatus of the invention, the output light beam of the light source is divided by the diffraction grating into three light beams. The three light beams are reflected by the first surface of the plane parallel plate so that they are applied through the objective lens to the recording medium. A portion of the three signal light beams from the recording medium are transmitted through the second surface of the plane parallel plate, while the remaining are reflected by the second surface so that they are transmitted through the first surface. One of the three signal light beams which corresponds to the main light beam of the 0-th order of diffraction is received by the first detecting means. Two of the diffraction light beams which the signal light beams form when passed through the diffraction grating, which correspond to the light beam of the −1st order of diffraction corresponding to the auxiliary light beam of the +1st order of diffraction and the light beam of the +1st order of diffraction corresponding to the auxiliary light beam of the −1st order of diffraction, are received by the second detecting means, where a tracking error signal is produced and output.

Accordingly, detection of the auxiliary light beams is not effected by the main light beam and a tracking error signal can be detected with high accuracy.

Furthermore, the provision of the first and second detectors for detecting the signal light beams enables the apparatus to be miniaturized without interfering with any optical light path.

There has thus been shown and described a novel optical recording and reproducing apparatus which fulfills all the objects and advantages sought therefor. Many changes, modifications, variations, and other uses and applications of the subject invention will, however, become apparent to those skilled in the art after considering the specification and the accompanying drawings which disclose preferred embodiments thereof. All such changes, modifications, variations, and other uses and applications which do not depart from the spirit and scope of the invention are deemed to be covered by the invention which is limited only by the claims which follow.

What is claimed is:

1. An optical image recording and reproducing apparatus comprising:
   a light source for generating a light beam to read data from a recording surface of a recording medium;
   a diffraction grating for diffracting said generated light beam into three light beams comprising a main light beam of the 0-th order of diffraction, an auxiliary light beam of the +1st order of diffraction, and an auxiliary light beam of the −1st order of diffraction;
   a plane parallel plate having a first surface and a second surface, said first surface for receiving and transmitting said three light beams to said recording surface, and said second surface for receiving and partially reflecting three signal light beams reflected by said recording surface;
   a first optical detector for detecting said main light beam of the 0-th order of diffraction of said signal light beams passing through said second surface of said plane parallel plate and for outputting an RF signal and a focus servo control signal in accordance with said detected main light beam; and
   a second optical detector, which receives said three signal light beams reflected by said second surface and diffracted by said diffraction grating, for detecting a first light beam of a −1st order of diffraction of said auxiliary light beam of the +1st order of diffraction and a second light beam of the +1st order of diffraction of said auxiliary light beam of the −1st order of diffraction and for outputting a tracking error signal in accordance therewith.

2. An optical image recording and reproducing apparatus as defined in claim 1, further comprising an objective lens for focusing said three light beams reflected by said first surface of said plane parallel plate on to the recording surface of said recording medium.

3. An optical image recording and reproducing apparatus as defined in claim 1, wherein said first optical detector comprises a four-division photo diode.

4. An optical image recording and reproducing apparatus as defined in claim 1, wherein said second optical detector comprises two photo diodes.

5. An optical image recording and reproducing apparatus as defined in claim 1, wherein said first surface is arranged in parallel with said second surface of said plane parallel plate.

6. An optical image recording and reproducing apparatus as defined in claim 1, wherein said plane parallel plate comprises a transparent medium.

7. An optical image recording and reproducing apparatus as defined in claim 1, wherein said first surface of said plane parallel plate is coated with a half-mirror on a transparent medium.

* * * * *